ced Oct. 24, 1967

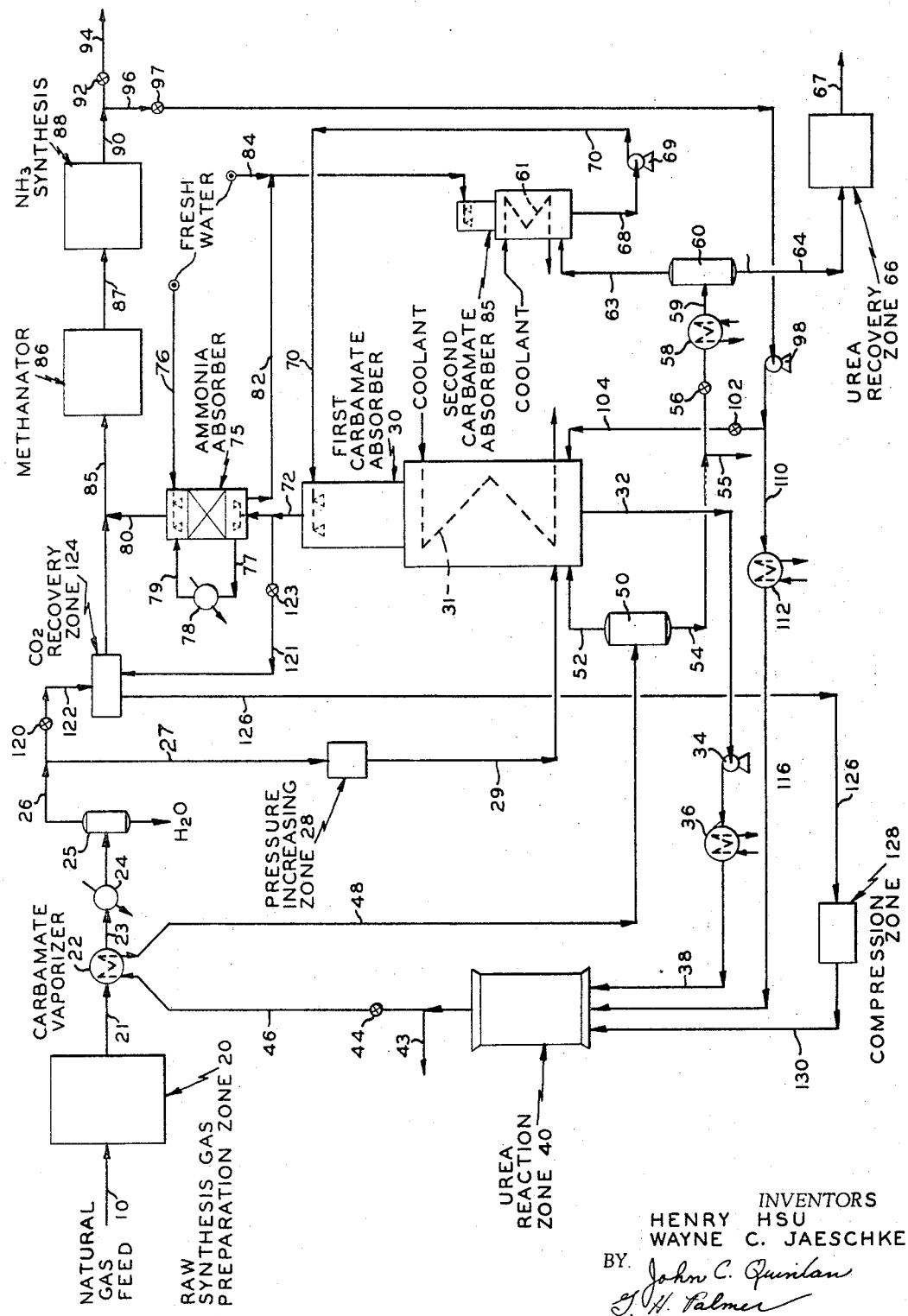

3,349,126
INTEGRATED AMMONIA AND UREA PROCESS
Henry Hsu, New Rochelle, and Wayne C. Jaeschke, Dobbs Ferry, N.Y., assignors to Pullman Incorporated, Chicago, Ill., a corporation of Delaware
Filed Sept. 20, 1965, Ser. No. 496,223
12 Claims. (Cl. 260—555)

This application is a continuation-in-part of prior and co-pending United States patent application Serial No. 222,531, filed September 10, 1962.

The present invention relates to an integrated process for the production of ammonia and urea.

Urea is used principally in fertilizers, animal feeds and in the production of plastic materials. It is produced commercially by the reaction of purified carbon dioxide and ammonia under elevated temperatures and pressures. The reactants for the urea synthesis are produced by treating selected feed stocks which include, e.g., natural gas and naphtha boiling range materials, in a synthesis gas preparation zone to obtain raw ammonia synthesis gas containing essentially nitrogen, hydrogen, and carbon dioxide. Carbon dioxide is separated by chemical absorption and ammonia is produced under an elevated pressure by the catalytic reaction of hydrogen and nitrogen. Purified carbon dioxide gas is liberated from the absorbent medium and then compressed from about atmospheric pressure to an elevated pressure suitable for carrying out the reaction with ammonia to produce urea. Unfortunately, since a large volume of carbon dioxide must be treated in the purification step and subsequently compressed for the urea reaction, the energy consumption for the urea process exceeds the level desired for efficient and profitable production of urea for use in the place of competing materials in its principal marketing areas.

It is, therefore, an object of the present invention to overcome and eliminate the difficulties inherent in the known urea processes and to provide an efficient and economical integrated process for the production of ammonia and urea.

Another object is to provide a more efficient urea process than heretofore known in the art.

Further objects and advantages inherent in the present invention will become apparent to those skilled in the art from the following description and disclosure.

The objects are generally accomplished in accordance with the present invention by passing ammonia synthesis gas from a synthesis gas preparation zone into a first zone which is maintained under suitable conditions to separate carbon dioxide from the synthesis gas in an ammonia-containing liquid thereby obtaining a condensate containing ammonia carbamate. The synthesis gas freed of carbon dioxide is passed into an ammonia synthesis gas zone while the condensate is passed into a second zone maintained under suitable conditions to produce urea from the ammonium carbamate.

More specifically, the objects are accomplished by providing ammonia synthesis gas containing carbon dioxide, hydrogen, and nitrogen, which is generally withdrawn from the synthesis gas preparation zone at a pressure below about 1000 p.s.i.g., preferably between about 200 and about 600 p.s.i.g., which is substantially below urea synthesis pressure, and separating carbon dioxide from the remaining ammonia synthesis gas in a first confined zone which will be referred to herein as the condensation and absorption zone preferably provided in the relatively low pressure end of a high pressure urea synthesis process. Carbon dioxide in the synthesis gas is absorbed in a solution containing free ammonia in the condensation and absorption zone thereby forming a condensate comprising ammonium carbamate. Synthesis gas free of carbon dioxide is employed as the feed mixture to an ammonia synthesis zone while the condensate comprising ammonium carbamate is withdrawn from the condensation and absorption zone and introduced into the urea synthesis zone. In a preferred embodiment in which the condensation and absorption zone is provided in a relatively low pressure portion of the process, the condensate is pressurized, e.g., by suitable liquid or slurry pumping means, to a pressure level suitable for introduction to a urea synthesis zone operated at an elevated pressure, preferably, between about 1700 and about 3500 p.s.i.g. and, most preferably, between about 2400 and about 2900 p.s.i.g. After permitting sufficient residence time to convert a substantial portion of the ammonium carbamate into urea and water, a reaction effluent is withdrawn from the urea synthesis zone. The reaction effluent is preferably depressurized and heated to decompose ammonium carbamate and drive off water thereby producing a gaseous mixture containing ammonia, carbon dioxide, and water which is separated from the remaining effluent containing aqueous urea. Preferably, such gaseous mixture is passed into the condensation and absorption zone in which it is condensed and used to absorb carbon dioxide present in the raw ammonia synthesis gas.

The condensation and absorption zone is generally maintained under suitable conditions for the absorption of carbon dioxide in an ammonia-containing liquid from the ammonia synthesis gas and for the formation of ammonium carbamate by the reaction of the ammonia and carbon dioxide. Preferably, the pressure in the condensation and absorption zone is maintained less than about 1000 p.s.i.g. and, most preferably, at a pressure which is substantially the same or slightly less than the pressure at which raw ammonia synthesis gas is introduced into the process. Absorption of carbon dioxide at relatively low pressure as compared with the urea synthesis pressures is preferred in order to eliminate separate purification and compression of the carbon dioxide utilized in the urea synthesis.

In the integrated ammonia and urea process, described herein, the entire carbon dioxide feed can be introduced into the urea synthesis process by way of the condensation and absorption zone. However, in a preferred modification of this process, a portion of the ammonia synthesis gas obtained from the synthesis gas preparation zone is diverted into a conventional carbon dioxide purification system in order to obtain substantially pure carbon dioxide. The relatively pure carbon dioxide is then compressed and introduced into the urea synthesis zone in which it reacts exothermically with ammonia to produce ammonium carbamate. The relative quantity of raw ammonia synthesis gas which is introduced into the urea process by way of the condensation and absorption zone to that which is passed through the carbon dioxide purification system is determined by heat balance considerations in the urea synthesis reactor. Since the reaction of carbamate decomposing to form urea and water is endothermic, and since the reaction of carbon dioxide with ammonia to form ammonium carbamate is highly exothermic, it is preferred to permit sufficient reaction between carbon dioxide and ammonia to maintain the temperature at the desired level for urea synthesis without requiring the application of heat from an external source.

It is apparent that in the preferred embodiment wherein the gaseous mixture containing ammonia, carbon dioxide, and water is separated from the urea reaction effluent and introduced to the condensation and absorption zone, the ammonia present in the condensate will provide at least a portion of the ammonia necessary for separation of carbon dioxide from the ammonia synthesis gas. In such preferred embodiment, it is nevertheless preferable to introduce at least a portion of the fresh ammonia feed into the condensation and absorption zone in order to improve the separation of carbon dioxide from the synthesis gas. On the other hand, where unreacted ammonia in the urea reaction zone effluent is not recycled via the condensation and absorption zone, it is necessary to introduce ammonia into the condensation and absorption zone in an amount sufficient to insure separation of carbon dioxide from the ammonia synthesis gas.

Having described the process of the present invention in general terms, reference is now had to the drawing which illustrates diagrammatically in elevation one specific embodiment of the process of the present invention. The drawing is described by reference to a numerical example which illustrates the flow of fluids through one embodiment of this process, although it is to be understood that the invention is not limited unduly thereby.

Briefly described, the drawing illustrates an integrated process for the production of ammonia from hydrogen and nitrogen in synthesis gas at least a portion of which has been freed of its carbon dioxide by absorption in the carbamate formation section of a urea synthesis process, and the synthesis of urea via ammonium carbamate from ammonia and carbon dioxide. In this process, ammonia synthesis gas containing carbon dioxide is produced from a suitable hydrocarbon feed in synthesis gas preparation zone 20, and at least a portion of the synthesis gas is introduced to a carbamate absorption zone represented by absorber 30 wherein the carbon dioxide content of the raw synthesis gas is depleted by the production of ammonium carbamate. The carbamate is withdrawn to a urea reaction zone 40 maintained under an elevated pressure for the synthesis of urea. The ammonia synthesis gas depleted with respect to carbon dioxide is withdrawn from another portion of the carbamate absorption zone and ultimately passed to an ammonia synthesis zone represented by the numeral 88. The urea synthesis illustrated in the drawing constitutes a so-called total recycle urea synthesis in which a urea reaction zone effluent is partially vaporized by reduction in pressure and heating to separate a gaseous mixture of ammonia and carbon dioxide. The gaseous mixture is condensed under conditions to produce a solution containing liquid ammonium carbamate or ammonium carbamate crystals in suspension. The solution is recycled to the urea reaction zone. The present invention, however, is not to be construed as limited to any particular form of the urea synthesis process or to any of the several methods of recycle, but is intended to include total and partial recycle of reactants and also "once-through" processes operated with no reactant recycle.

For the purposes of a numerical example, natural gas is introduced in line 10 to synthesis gas preparation zone 20 wherein by gas reforming and conversion methods and means well-known in the art 23,820 pounds-per-hour of wet raw ammonia synthesis gas containing about 17.7% carbon dioxide, 19.5% nitrogen, and 61.3% hydrogen on a dry mole basis, and additionally containing methane, and a small amount of carbon monoxide is provided in line 21 at a temperature of 390° F. under 250 p.s.i.g. The present invention is not limited to employing natural gas, as feed in line 10, or to any other given method of providing raw ammonia synthesis gas, or to any given set of temperature and pressure of the effluent in line 21, it being understood that gas preparation methods are known whereby $C_1$–$C_8$ and even higher hydrocarbon feed stocks can be converted to suitable raw ammonia synthesis gas.

Raw ammonia synthesis gas in line 21 is partially cooled, in the example, by passing a urea-containing effluent in line 46 withdrawn from urea reactor 40 in indirect heat exchange therewith in vaporizer 22. Ammonium carbamate and water also contained in the urea-containing effluent are at least partially vaporized in vaporizer 22 and withdrawn at a temperature maintained at about 260° F. in line 48.

Generally, in the past, the high temperature level heat made available by heat exchanging and thereby cooling an effluent from a synthesis gas preparation zone was at least partially employed in purifying carbon dioxide in the carbon dioxide removal and recovery steps. By diverting at least a portion of the raw ammonia synthesis gas to an ammonium carbamate absorption zone provided as part of a urea process in accordance with the present invention, at least a portion of the same high temperature level heat is made available for other process uses such as, for example, heating the urea reactor effluent or other urea synthesis streams and thereby reducing the overall process steam consumption. The quantity of high temperature level heat which is made available for other process uses is in proportion to the quantity of raw ammonia synthesis gas diverted to the carbamate production zone, the available heat being increased as the amount of gas which is diverted is increased.

Partially cooled gas in line 23 is further reduced in temperature in heat exchanger 24 to condense water vapor and passed to water separator 25 wherein condensate is removed as shown in the drawing. In the example, raw ammonia synthesis gas containing about 5440 pounds-per-hour of carbon dioxide is removed from separator 25 in line 26 and split into two streams, about 50% being passed in line 27 to absorber 30 and the remaining 50% to carbon dioxide recovery zone 124 through valve 120 in line 122. The gas in line 27 is adjusted to an appropriate pressure level in pressure-increasing zone 28, i.e., about 310 p.s.i.g. prior to being passed to carbamate absorber 30 in line 29.

Generally, at least a portion of the raw ammonia synthesis gas in line 26 is diverted in line 27, the remaining portion, if any, being conducted through valve 120 in line 122 to a carbon dioxide recovery zone represented by the numeral 124. Carbon dioxide is separated from the synthesis gas in zone 124, for example, by an MEA absorption system operated at about 235 p.s.i.g. Carbon dioxide of about 98% purity is obtained in zone 124 by stripping the carbon dioxide-laden solvent utilizing a portion of the high temperature level heat obtained by heat exchanging the raw ammonia synthesis gas. Purified carbon dioxide, about 2720 pounds-per-hour, in the example, is passed in line 126 to compression zone 128, pressurized to urea reaction pressure, and introduced to urea reactor 40 in line 130. Carbon dioxide introduced to the reactor in line 120 reacts exothermically with excess ammonia introduced in line 116 to produce ammonium carbamate. The exothermic heat of the carbamate reaction is useful in maintaining the urea reaction temperature in urea reactor 40. By controlling the ratio of the raw ammonia synthesis gas introduced to carbon dioxide recovery zone 124 to that which is diverted to carbamate absorber 30 in any given urea synthesis process, a ratio can be found whereby the urea reactor temperature is maintained at the desired level without requiring heat to be supplied from external sources.

In reference to the gas introduced in line 29 to carbamate absorber 30, it should be noted that in general any unreactive gas containing carbon dioxide such as, for example, flue gas, is successfully utilized as feed to a urea synthesis process at this point. It is important, however, that such unreactive gas contains no substance deleterious either to the carbamate or urea reaction or product. It is particularly advantageous in the present integrated process that the raw ammonia synthesis gas which is provided in line 27 is at a pressure such that only slight and in some cases no compression is needed in zone 28.

In the example, first carbamate absorber 30, to which the carbon dioxide-containing synthesis gas is introduced, is an elongated cylindrical vessel, partially filled with an aqueous solution of ammonium carbamate and ammonia, adapted for the ingress and egress of appropriate streams of material as further described and further adapted with cooling means. Generally, any suitable means for absorbing carbamate may be used in the process of the present invention, and the absorption means forms no part of the present invention.

Cooling coil 31 is provided through which a suitable coolant such as, for example, water, which is circulated in order to remove the heat liberated by the reaction of ammonia and carbon dioxide to form ammonium carbamate and to maintain a temperature of about 185° F. and a pressure of about 300 p.s.i.g., in the example, in absorber 30. Also in the example, an aqueous ammonium carbamate solution obtained from second carbamate absorber 85 is introduced to an upper portion of absorber 30 in line 70 at the terminal portion thereof by means of spray headers or other suitable distributing means. The solution thusly introduced in line 70 has the following composition: 2098 ammonia, 1200 carbon dioxide, and 2106 water, all in pounds-per-hour. When introduced to a suitable portion of absorber 30 the carbamate solution provides a final scrubbing for synthesis gas withdrawn in line 72.

In general terms, a carbamate absorption zone such as that represented by carbamate absorber 30 is maintained under suitable carbamate formation conditions, however, carbamate absorber 30 is preferably maintained under a pressure between about 0 and about 1000 p.s.i.g. and, most preferably, between about 150 and about 350 p.s.i.g. at a temperature, preferably, between about 60 and about 300° F. and, most preferably, between about 160 and about 220° F. It is further necessary in the operation of the present invention to provide excess ammonia in a carbamate reaction zone to react with carbon dioxide introduced in the raw ammonia synthesis gas. Preferably, an ammonia to carbon dioxide ratio is maintained between about 2:1 and about 15:1 and, most preferably, between about 4:1 and about 6:1. Although it is desirable that a sufficient excess of ammonia is present in order to completely react carbon dioxide substantially completely under absorption zone conditions, an upper limit to the amount of ammonia which is present is determined by the tolerance for ammonia loss from the system, more ammonia being lost as the ammonia pressure is increased.

In order to maintain a desired ammonia to carbon dioxide ratio, in the example, ammonia is introduced as fresh feed to the urea synthesis into urea reaction zone 40 by means of line 116 at the rate of 4280 pounds-per-hour and ultimately a portion thereof flows to carbamate absorption zone 30 as hereinafter described. A portion of the ammonia introduced in line 116 is reacted with 98% carbon dioxide introduced in line 130 in order to maintain urea reaction temperature as hereinbefore mentioned. The effluent withdrawn from reactor 40 in line 42 is reduced in pressure upon passage through pressure reduction valve 44 and vaporized on passage through carbamate vaporizer 22 in line 46, as previously described.

A vapor-liquid mixture is introduced in line 40 to separator 50 wherein a gaseous mixture comprising 7600 pounds-per-hour of ammonia, 1600 pounds-per-hour water, and 2420 pounds-per-hour of carbon dioxide is separated from the liquid and passed in line 52 to absorber 30. The liquid solution is withdrawn from separator 50 in line 54 at the rate of 15,100 pounds-per-hour.

Generally, a desired ammonia to carbon dioxide ratio is maintained in absorber 30 by the introduction of ammonia to the absorber in any suitable manner such as in the aforementioned recycle gas in line 52, in recycle ammonium carbamate solution in line 70, or directly as fresh feed in line 104. Fresh ammonia feed derived from any suitable source is introduced, as previously mentioned in the example in line 116 or alternately in line 104. A preferred source of fresh ammonia feed is, of course, ammonia derived from ammonia synthesis zone 88. Ammonia produced in synthesis zone 88 can, of course, be passed in line 90 through valve 92 in line 94 to ammonia storage or to other uses not shown in the drawing. In the integrated process of the present invention, however, at least a portion of the ammonia produced in zone 88 is passed to the urea synthesis process by opening valve 97 in line 96. Accordingly, ammonia flows in line 96 to pump 98 wherein it is pressurized to an appropriate level for introduction, in one alternate, to a carbamate absorption zone such as carbamate absorber 30 and passed through opened valve 102 in line 104. In the example, ammonia is passed in line 110 to heat exchanger 112 and thence in line 116 to urea reaction zone 40 as previously mentioned.

Referring again to conditions maintained in a carbamate absorption zone represented, in this example, by absorber 30 the absorption of ammonia and carbon dioxide is carried out in the presence of sufficient water to maintain ammonium carbamate formed therein substantially in the liquid phase. For this reason, a water to carbon dioxide ratio is maintained at a level which is, preferably, at least about 0.1:1 and, most preferably, between about 0.5:1 and about 1.8:1. In order to maintain a water ratio within the above-stated limits, about 2100 pounds-per-hour of water is introduced as previously mentioned in the aqueous ammonium carbamate solution in line 70. An alternative method of maintaining a water ratio within the above ranges is to supply fresh water from any suitable source to absorber 30. Still another alternative method of maintaining the desired water ratio is to utilize water vapor obtained from a urea concentrator, e.g., situated in recovery zone 66, in order to recover the small percentage of ammonia in such material.

In the example, a solution containing ammonium carbamate is withdrawn from carbamate absorber 30 at the rate of 19,744 pounds-per hour in line 32 for ultimate passage, at least in part to the urea reactor. The substantially liquid carbamate is pressurized by means of pump 34, elevated in temperature in heater 36, and passed in line 38 to urea reaction zone 40 which is maintained, generally, under an elevated temperature and pressure to produce urea. In the example, urea reaction zone 40 is maintained under a pressure of about 2600 p.s.i.g. at a temperature of about 360° F., and in this case, the urea reaction effluent contains about 7270 pounds-per-hour of urea which is, in terms of weight percent, about 27% of the weight of the solution.

Where it is desired to effect a "once-through" process, valve 44 is closed completely and the urea reactor effluent is withdrawn in line 43 to subsequent purification not shown in the drawing.

The present invention is not limited to pressure and temperature conditions employed in carrying out the urea reaction, and it is to be understood that any suitable elevated temperature and pressure can be employed therein. Preferably, the urea reaction zone employed in combination with the present invention is maintained between about 1700 and about 3500 p.s.i.g. and, most preferably, between about 2400 and about 2900 p.s.i.g. at a temperature preferably maintained between about 240 and about 450° F. and, most preferably, between about 240 and about 400° F. As was previously stated, in the example of a total recycle process as shown in the drawing, the partially vaporized urea reactor effluent is separated in separator 50 into a gaseous mixture in line 52 and 15,100 pounds-per-hour of a liquid mixture in line 54. The liquid mixture contains about 48% urea, and additionally contains water, ammonia and carbon dioxide values which, in the example, are substantially recovered by a suitable method such as the second carbamate absorption zone shown in the drawing.

As an alternate method for effecting a partial recycle process, the liquid mixture containing urea is withdrawn in line 55 by closing valve 56 in line 54.

As shown in the drawing, the substantially liquid mixture in line 54 is passed through pressure reduction valve 56 whereby it is reduced in pressure to about 20 p.s.i.g.; and passed to vaporizer 58 whereby it is heated to about 250° F. in order to vaporize ammonia and carbon dioxide. The resulting vapor-liquid mixture is passed in line 59 to separator 60 wherein the vapor is separated and passed to second carbamate absorber 85 in line 63 while the liquid portion which is about 67% by weight urea is passed in line 64 at the rate of 10,800 pounds-per-hour to a subsequent urea recovery zone 66, and thence as solidified urea product to storage in line 67.

To recover ammonia and carbon dioxide values contained in the gaseous stream introduced to second carbamate absorber 85 in line 63, make-up water is introduced in line 82 and conditions are maintained such that a weak ammonium carbamate solution is formed. Accordingly, a pressure is maintained in absorber 85, preferably, between about 0 and about 40 p.s.i.g. and, most preferably, between about 5 and about 20 p.s.i.g. at a temperature, preferably, between about 50 and about 260° F. and, most preferably, between about 70 and about 110° F. To maintain the above conditions, a suitable coolant such as, for example, water, is circulated in coil 61 situated in carbamate absorber 85.

In the example, carbamate absorber 85 is maintained under a pressure of 18 p.s.i.g. at a temperature of 90° F. and water withdrawn from absorber 75 containing a small percentage of ammonia, recovered as hereinafter described, is introduced at the rate of 1200 pounds-per-hour in line 82 to an upper portion of absorber 85 as shown in the drawing. As will become apparent from the further description such a method introducing make-up water to the process is preferred because it constitutes an efficient method of recovering quantities of ammonia and also some carbon dioxide contained in the gaseous effluent from carbamate absorber 30. As an alternate method, water is introduced to carbamate absorber 85 from line 84 via line 82.

In the example, ammonium carbamate in aqueous solution is withdrawn from a bottom portion of absorber 85 in line 68, pressurized by means of pump 69, and passed in line 70 to first carbamate absorber 30 as previously described.

Reference is now made to the gaseous stream which is withdrawn from first carbamate absorber 30, and generally from a carbamate absorption zone employed in connection with the present invention. In the example, the gaseous stream comprises ammonia synthesis gas withdrawn in line 72 to ammonia absorber 75 at the rate of 5150 pounds-per hour. The gaseous constituents which make up raw ammonia synthesis gas pass through a carbamate absorption zone with substantial completeness while the carbon dioxide constituent is depleted, and under preferable conditions, depleted substantially completely. Generally speaking, the gaseous stream withdrawn in line 72 contains a very small percentage of ammonia and carbon dioxide depending upon the vapor pressure of these fluids present in the carbamate absorption zone. In order to employ the ammonia synthesis gas withdrawn from carbamate absorber 30 in a known ammonia synthesis process, it is necessary to remove its carbon dioxide content, and it is desirable from an economic standpoint to remove its ammonia content.

In the example, the ammonia synthesis gas in line 72 is passed to absorber 75 which is shown diagrammatically in the figure and wherein the ammonia contained in the gas is scrubbed by means of water maintained in the absorber at a suitable temperature and pressure. Accordingly, water at the rate of 1100 pounds-per-hour is introduced in line 76 to an upper portion of absorber 75 and flows downwardly by gravity in attenuated flow over packing contained therein countercurrent to the upflowing synthesis gas introduced in line 72. To maintain a temperature of 95° F. in absorber 75, aqueous ammonia solution which collects in the bottom of absorber 75 is withdrawn to cooler 78 in line 79, reduced in temperature, and returned to the absorber in line 79. A pressure of 295 p.s.i.g. is maintained in the absorber, which pressure is sufficient for the purpose of passing the aqueous ammonia solution in line 82 to carbamate absorber 85 without further compression. It is generally important that the pressure in absorber 75 is maintained at least less than the pressure in the carbamate absorber 30 so that gas contained in line 72 can be introduced to the absorber 75 without compression.

An alternative method of recovering ammonia from ammonia synthesis gas comprises employing a scrubbing bath of a mineral acid such as, for example, sulfuric, nitric, or hydrochloric acid, or mixture thereof.

In another alternative method, ammonia synthesis gas withdrawn in line 72 is passed in line 121 through opened valve 123 to the aforementioned carbon dioxide recovery zone 124 wherein residual carbon dioxide is recovered from the synthesis gas with a sacrifice of ammonia values. Passing the substantially ammonia free gas in line 80 to carbon dioxide recovery zone 124 constitutes another alternative. Still another alternative method comprises passing the ammonia synthesis gas withdrawn in line 72 through a cooling zone in order to remove condensable constituents therefrom.

In the example, about 5,030 pounds-per-hour of ammonia synthesis gas is withdrawn in line 80 from absorber 75, mixed in line 85 with ammonia synthesis gas from carbon dioxide recovery unit 124 from which carbon dioxide has been separated, and passed to methanator 86.

In a second example of operation of the process of the present invention, urea reaction zone 40 is maintained under about 3000 p.s.i.g. at a temperature of about 374° F. The $NH_3:CO_2$ ratio is maintained at about 6:1 and the $H_2O:CO_2$ ratio, about 1:1. Under these conditions, the conversion of carbon dioxide is about 73%. In this example, about 50% of the carbon dioxide required for the conversion, which is about 3,138 pounds-per-hour, is introduced in line 130 following purification and compression thereof. The introduction of this quantity of carbon dioxide is sufficient to maintain reaction temperature at about 374° F. The remaining 50% of the required carbon dioxide is obtained by passing ammonia synthesis gas into the first carbamate absorber 30 to separate the carbon dioxide therefrom. In this example, absorber 30 is maintained at a temperature of about 140° F. and under a pressure of about 375 p.s.i.g. Liquid ammonia is introduced in line 104 at the rate of 4,946 pounds-per-hour to aid in separating the carbon dioxide and to provide the desired solution for recycle to urea reaction zone 40 via line 32. The flow composition in pounds-per-hour of the recycle material withdrawn from absorber 30 in line 32 is approximately as follows: 19,431, $NH_3$; 5,244, $CO_2$; and 3,422, $H_2O$. The recycle material in line 32 is passed in indirect heat exchange relationship with a gaseous mixture of unused reactant materials separated from the reaction effluent contained in line 52 in a heat exchange zone, not shown in the drawing. The solution in line 32 is then further heated to 330° F. in heat exchange zone 36 prior to its introduction to reaction zone 40. The material contained in line 52 is introduced into absorber 30 and has a flow composition in pounds-per-hour substantially as follows: 13,575, $NH_3$; 2,037, $CO_2$; and 2,771, $H_2O$. Liquid material comprising aqueous urea is separated from vessel 50 in line 54 at 320° F. under a pressure of about 375 p.s.i.g. and passed in line 54 for further treatment. The material in line 54 is separated in vessel 60 at about 35 p.s.i.g. and about 240° F. to yield a urea solution in line 44 and a gaseous mixture of ammonia, carbon dioxide, and water in line 63 which is introduced into second carbamate absorber 85. A recycle material is withdrawn from absorber 85 in line 68 having the following flow composition in pounds-per-hour: 910, $NH_3$; 69, $CO_2$; and 651, $H_2O$. This solution is introduced into an upper portion of absorber 75 by means of a conduit, not shown in the drawing, in order to remove carbon dioxide and ammonia remaining in the synthesis gas withdrawn overhead from absorber 30. The synthesis gas withdrawn overhead in line 81 containing essentially hydrogen and nitrogen, and a small amount of ammonia and oxides of carbon, is cooled to a temperature of about 35° F. in order to condense ammonia therefrom.

Methanator 86 represents a preferred method of removing carbon oxides, whereby carbon dioxide and carbon monoxide contained in the ammonia synthesis gas is converted to methane. Such methanation units are well-known and require no further description at this point.

Ammonia synthesis gas substantially free of ammonia and carbon dioxide is passed in line 87 to an ammonia synthesis represented by the numeral 88. In zone 88, nitrogen and hydrogen are combined under an elevated pressure to produce ammonia by method and means well-known in the art and likewise requiring no further description herein.

Having thus described the invention with reference to a specific example thereof and with reference to several alternative processes, it is to be understood that many modifications and alterations will become apparent to those skilled in the art without departing from the scope of the present invention, and that the present invention is limited only to the claims.

What is claimed is:

1. An integrated process for making ammonia and urea which comprises: passing ammonia synthesis gas from a synthesis gas preparation zone and containing carbon dioxide, nitrogen and hydrogen into a first zone maintained under conditions to separate carbon dioxide from the synthesis gas in an ammonia-containing liquid and to obtain a condensate comprising ammonium carbamate, passing the remaining ammonia synthesis gas to an ammonia synthesis zone, passing said condensate into a second zone maintained under urea synthesis conditions to produce urea therefrom.

2. The method of claim 1 in which the ammonia feed required for the urea synthesis in said second zone is introduced into said first zone thereby providing said ammonia-containing liquid, a portion of said ammonia is reacted with carbon dioxide to form a condensate comprising ammonia and ammonium carbamate in said first zone, and said condensate is passed into said second zone.

3. An integrated process for making ammonia and urea which comprises: passing ammonia synthesis gas from a synthesis gas preparation zone and containing carbon dioxide, nitrogen and hydrogen into a first confined zone maintained under conditions to separate carbon dioxide from the synthesis gas in an ammonia-containing liquid and to obtain a condensate comprising ammonium carbamate, passing the remaining ammonia synthesis gas to an ammonia synthesis zone, passing said condensate into a second confined zone maintained under urea synthesis conditions to produce urea therefrom, withdrawing an urea-containing effluent from the second confined zone and separating therefrom a gaseous mixture comprising ammonia and carbon dioxide, and condensing said gaseous mixture in said first confined zone to provide at least a portion of said ammonia-containing liquid.

4. The method of claim 3 in which a first portion of said ammonia synthesis gas is passed from said synthesis gas preparation zone into said first confined zone, a second portion of said ammonia synthesis gas is treated to recover substantially pure carbon dioxide therefrom, said carbon dioxide is passed into said second confined zone and reacts with ammonia contained therein to provide the heat required to maintain the desired temperature level for urea synthesis in said zone.

5. The method of claim 3 in which a portion of the ammonia feed required in the urea synthesis is introduced into said first confined zone and a second portion is introduced into said second confined zone.

6. An integrated process for making ammonia and urea which comprises: preparing ammonia synthesis gas containing carbon dioxide, nitrogen and hydrogen under a pressure below about 1000 p.s.i.g., introducing said synthesis gas into a first confined zone maintained under conditions to separate carbon dioxide from the synthesis gas in an ammonia-containing liquid including a pressure below about 1000 p.s.i.g. and to obtain a condensate comprising ammonium carbamate, passing the remaining ammonia synthesis gas to an ammonia synthesis zone, withdrawing condensate from said first confined zone and increasing the pressure thereon to a level suitable for introduction into a second confined zone maintained under urea synthesis conditions, producing urea from said condensate in said second confined zone, withdrawing an urea-containing effluent from said second confined zone and separating therefrom a gaseous mixture comprising ammonia and carbon dioxide and condensing said gaseous mixture in said first confined zone to provide at least a portion of said ammonia-containing liquid.

7. The method of claim 6 in which said first confined zone is maintained under a pressure between about 0 and about 1000 p.s.i.g. and said second confined zone is maintained under between about 1700 and about 3500 p.s.i.g.

8. The method of claim 6 in which said urea-containing effluent is reduced in pressure and heated to separate said gaseous mixture comprising ammonia and carbon dioxide.

9. The method of claim 6 in which said urea-containing effluent is passed in indirect heat exchange relationship with said ammonia synthesis gas containing carbon dioxide, nitrogen and hydrogen prior to the introduction of such gas into said first confined zone to heat said effluent to a suitable pressure for separating said gaseous mixture of ammonia and carbon dioxide therefrom.

10. The method of claim 6 in which water is introduced into said first confined zone to maintain the ammonium carbamate formed therein in the liquid phase.

11. The process of claim 6 in which ammonia synthesis gas is withdrawn overhead from said first confined zone containing a small amount of ammonia and carbon dioxide, such gas is contacted with water under a pressure and temperature such that ammonia is transferred into said water, and recycling the resulting weak aqueous ammonia solution to a suitable portion of said first confined zone to provide at lease a portion of the water required therein to maintain ammonium carbamate in the liquid phase thereby conserving ammonia in the system.

12. An integrated process for making ammonia and urea which comprises: preparing ammonia synthesis gas containing carbon dioxide, nitrogen and hydrogen under a pressure below about 1000 p.s.i.g., introducing said synthesis gas into a first confined zone maintained under conditions to separate carbon dioxide from the synthesis gas in an ammonia-containing liquid including a pressure below about 1000 p.s.i.g. and to obtain a slurry comprising crystals of ammonium carbamate and ammonia, passing the remaining ammonia synthesis to an ammonia synthesis zone, pressurizing and introducing said slurry into a second confined zone maintained under urea synthesis conditions, withdrawing an urea-containing effluent from said second confined zone, separating a gaseous mixture comprising ammonia, water and carbon dioxide from said effluent, and condensing said gaseous mixture in said first confined zone.

References Cited
UNITED STATES PATENTS

| | | | |
|---|---|---|---|
| 1,730,208 | 10/1929 | Aetheington et al. | 260—555 |
| 3,069,234 | 12/1962 | Cook et al. | 23—199 |
| 3,310,376 | 3/1967 | Cook et al. | 23—199 |

HENRY R. JILES, *Primary Examiner.*

UNITED STATES PATENT OFFICE
CERTIFICATE OF CORRECTION

Patent No. 3,349,126                      October 24, 1967

Henry Hsu et al.

It is hereby certified that error appears in the above numbered patent requiring correction and that the said Letters Patent should read as corrected below.

Column 1, line 52, for "ammonia" read -- ammonium --; column 7, line 24, for "1200" read -- 1220 --; column 9, line 11, for "dioxide" read -- oxides --; column 10, line 69, for "Aetheington" read -- Aetherington --.

Signed and sealed this 11th day of February 1969.

(SEAL)
Attest:

Edward M. Fletcher, Jr.
Attesting Officer

EDWARD J. BRENNER
Commissioner of Patents